Aug. 31, 1965  V. A. HOOVER  3,203,275

MECHANICAL ACTUATOR

Filed Nov. 26, 1962  8 Sheets-Sheet 2

INVENTOR.
VAINO A. HOOVER

BY Fulwider Patton, Rieber,
Lee, and Utecht
ATTORNEYS

Fig. 3.

INVENTOR.
VAINO A. HOOVER
BY Fulwider Patton, Rieber,
Lee, and Utecht
ATTORNEYS

Aug. 31, 1965

V. A. HOOVER 3,203,275

MECHANICAL ACTUATOR

Filed Nov. 26, 1962

INVENTOR.
VAINO A. HOOVER

BY Fulwider Patton, Rieber,
Lee, and Utecht

ATTORNEYS

Aug. 31, 1965

V. A. HOOVER 3,203,275

MECHANICAL ACTUATOR

Filed Nov. 26, 1962

INVENTOR.
VAINO A. HOOVER

BY Fulwider Patton, Rieber,
Lee, and Utecht
ATTORNEYS

Aug. 31, 1965 V. A. HOOVER 3,203,275
MECHANICAL ACTUATOR
Filed Nov. 26, 1962 8 Sheets-Sheet 7

INVENTOR.
VAINO A. HOOVER
BY Fulwider Patton, Rieber,
Lee, and Utecht
ATTORNEYS

Aug. 31, 1965

V. A. HOOVER 3,203,275

MECHANICAL ACTUATOR

Filed Nov. 26, 1962

INVENTOR.
VAINO A. HOOVER

BY Fulwider Patton, Rieber,
Lee, and Utecht
ATTORNEYS

United States Patent Office 3,203,275
Patented Aug. 31, 1965

3,203,275
MECHANICAL ACTUATOR
Vaino A. Hoover, 1433 San Vicente Blvd.,
Santa Monica, Calif.
Filed Nov. 26, 1962, Ser. No. 240,103
13 Claims. (Cl. 74—665)

This invention relates generally to rotary mechanical actuators for converting relatively high speed, low torque rotary input motion into relatively low speed, high torque rotary output motion. This invention more particularly relates to a rotary actuator for operating a movable component of an aircraft airfoil, such as a leading edge or trailing edge flap or the like device.

The apparatus of this invention finds its most important application in the direct operation of a leading edge flap of an aircraft wing to position such flap at any desired angle between fully up and fully down positions.

As is well known to those skilled in the art, the physical requirements for a wing flap actuator, particularly for a leading edge flap are very severe. Among these requirements are that the actuator unit be of such size and shape as to fit within the required portion of the airfoil configuration, that it be as light as possible and at the same time exhibit the necessary strength and stiffness to operate the flap reliably and positively without permitting any tendency for flutter of the flap within the permissible air speed range of the aircraft. This latter requirement is particularly important in connection with leading edge airfoil devices, which are more or less inherently unstable with respect to the relative air stream in which they are positioned.

It is, accordingly, an object of this invention to furnish a mechanical rotary actuator having a minimum size to strength ratio for the required gear reduction.

It is another object of this invention to furnish a mechanical rotary actuator having maximum strength and stiffness to weight and size ratio for the required gear reduction.

It is a further object of this invention to furnish a light compact rotary actuator unit having improved efficiency with respect to its strength, durability, and stiffness characteristics.

It is a still further object of this invention to furnish an actuator unit adapted to be attached to a structural component of an airfoil, such as a wing beam, and combine the function of rigidly pivotally supporting and directly moving a wing flap member.

It is a still further object of this invention to furnish an actuator unit adapted to be attached to a structural component of an airfoil, such as a wing beam, for direct supporting connection to a wing flap and to be mechanically driven by remotely located means.

It is an additional object of this invention to furnish an actuator unit, which embodies a novel gear reduction arrangement wherein all of the resultant intermediate internal forces associated therewith between the input and output are wholly contained and confined within a relatively compact high strength housing enabling relatively simple, light weight attachment means to be employed and without transfer of such forces either to the aircraft fuselage or wing structure.

It is still another object of this invention to provide an actuator unit fulfilling the other stated objects, and which is adapted to be connected for simultaneous operation in series with one or more other units of the same construction, whereby a plurality of such units may be employed for simultaneous hinged support and movement of an elongated airfoil component.

It is still another object of this invention to provide an actuator which is symmetrical with respect to a transverse plane passing through the center of the actuator so that identical units can be used for both right hand and left hand wing sections.

The objects of this invention are attained, briefly, by a self-contained axially arranged reduction gear train, an important feature of which resides in the inclusion therein of a plurality of parallel operating gear reduction trains arranged such that they present both axial and radial symmetry, whereby the maximum internal forces are balanced and minimized on both gear teeth and shaft bearings, and whereby such forces are contained within a compact unit enclosure which itself comprises a part of the gear train. Another important feature resides in the employment of a novel choice of gear teeth numbers in connection with a chosen plurality of parallel working gear trains, whereby tooth contact locations between different meshing gears therein are at different phases, such that maximum tooth stresses in the several gear trains do not occur simultaneously. A stronger and smoother operating gear train structure results. A large saving in weight together with increased reliability and strength and the reduced backlash characteristics also result.

These and other objects, advantages, and features of novelty will be evident hereinafter.

In the drawings which illustrate a preferred embodiment of the invention and in which like reference characters designate the same or similar parts through the several views.

Figure 3:
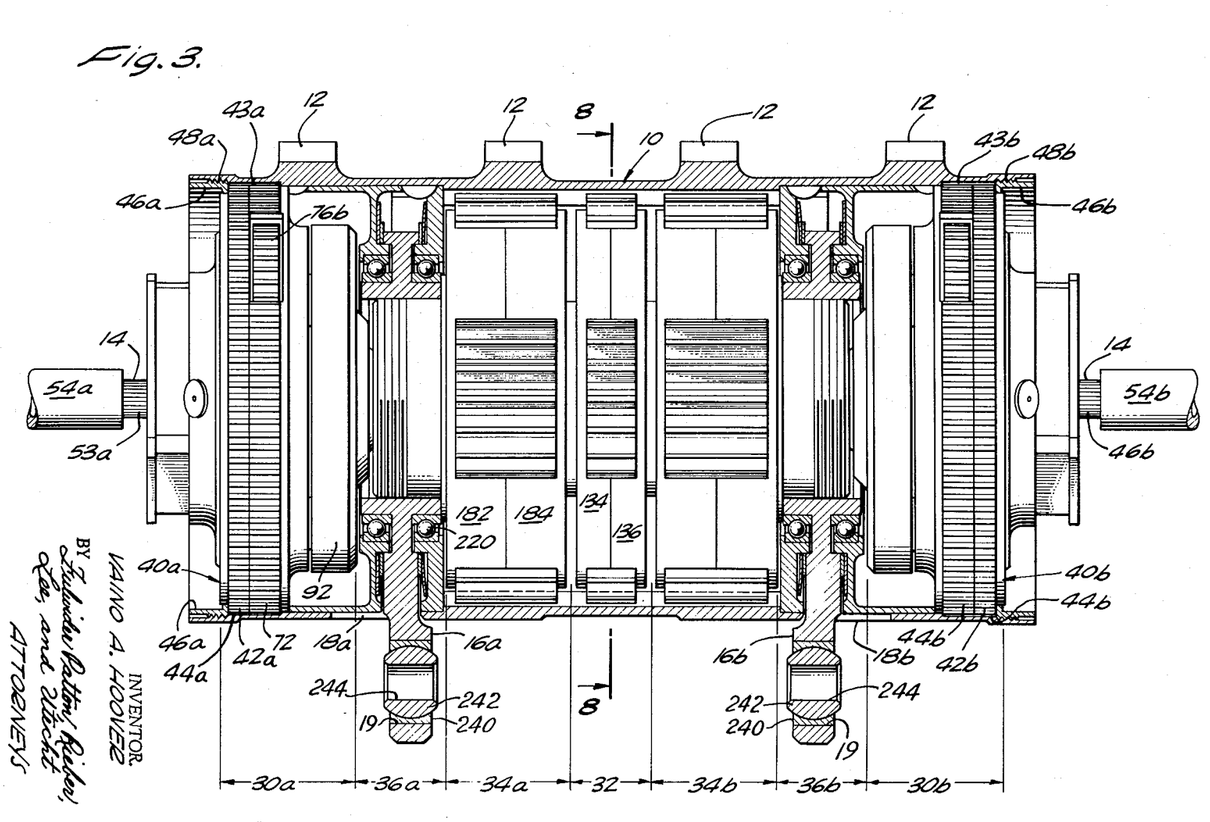
FIGURE 3 is a view partly in longitudinal section and partly in elevation of the complete general assembly of the apparatus of the invention.

Referring first primarily to FIGURE 3, the apparatus assembly, as exteriorly viewed, comprises a generally cylindrical housing 10 having a plurality of integrally formed, laterally extending, exterior attachment lugs 12, and within which substantially all of the inner compopents of the apparatus are contained, an input drive shaft 14 which extends concentrically through and projects from both ends of the housing, and a pair of output actuator arms 16a and 16b, which extend radially out of the side of the housing 10 through a pair of suitably located circumferential slots 18a and 18b.

Figure 2:
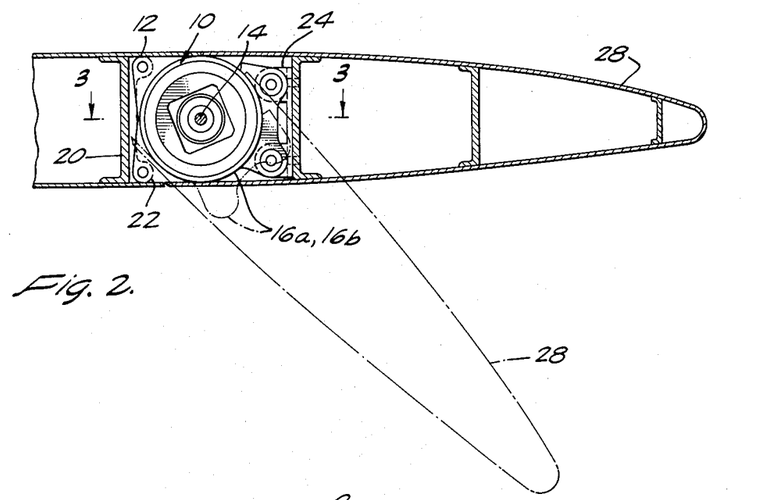
FIGURE 2 is a cross sectional view of a leading edge portion of an airfoil showing an end elevational view of the apparatus of the invention and illustrating a typical mode of installation and operation therein.

In a typical installation of the apparatus assembly in the leading edge portion of an airfoil for actuation of a lead edge flap, as illustrated in FIGURE 2, the housing 10 is normally fixed to a structural member, such as a beam or spar 20 by means of a suitable attachment fixture 22 to which the attachment lugs 12 are bolted, and the actuator arms 16a and 16b are bolted to suitable attachment fixtures 24 which are fixed to a structural member, such as a beam 26, of the leading edge flap 28. The input drive shaft 14 is coupled at either or both exterior ends thereof to suitable extension drive shafts (not shown), through which it may be connected to or intermediate one or more other like units similarly installed for simultaneous series operation. The shaft 14 may thus be rotated in either direction for movement of the actuator arms and the attached flap in either direction between their predetermined limits of fully up and fully down positions, as indicated in solid lines and broken lines, respectively, in FIGURE 2. A number of such units are usually attached in spaced apart, substantially coaxial relation to each other along the lengths of such beams or spars, intermediate the airfoil and flap for simultaneous series operation and actuation of the flap.

Figure 4:
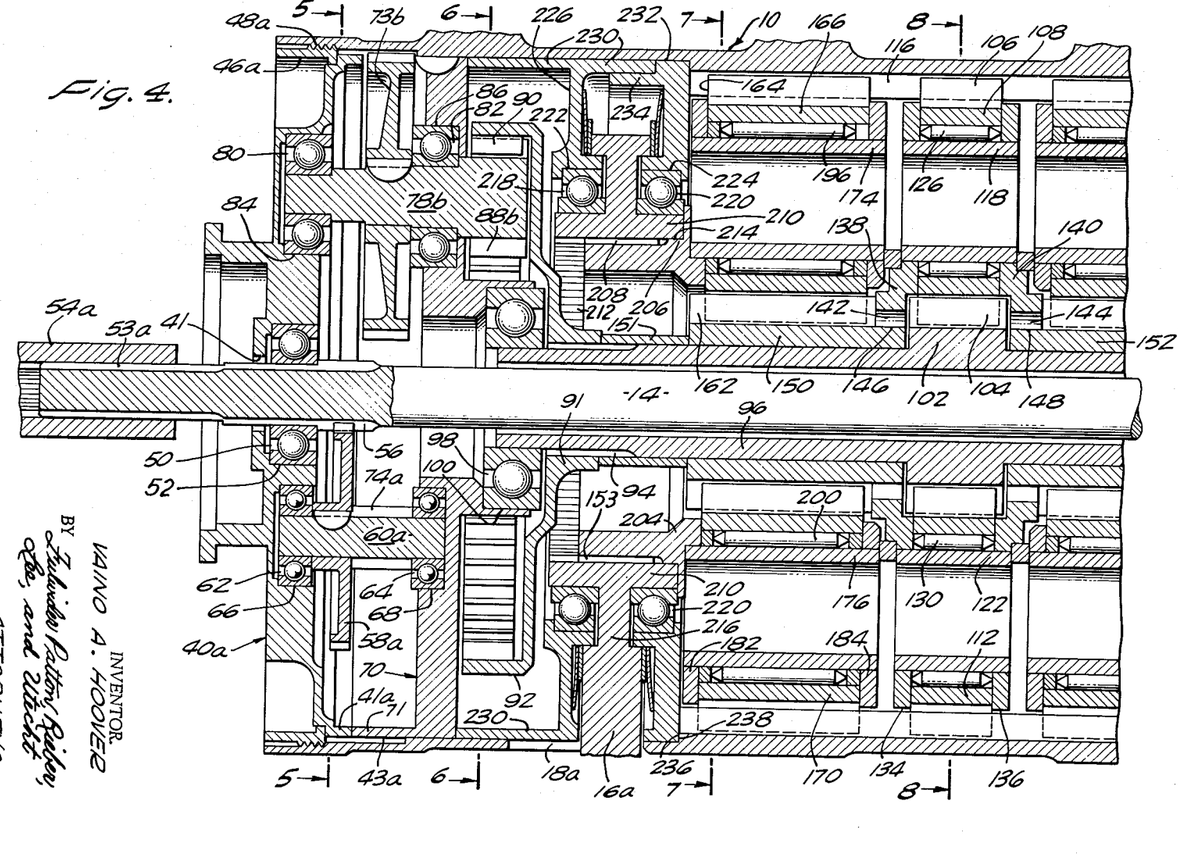
FIGURE 4 is a developed longitudinal sectional view of the apparatus of the invention taken approximately as indicated by line 4—4 in FIGURE 5, such section, similar to FIGURE 1, showing slightly more than half of the longitudinal length of the apparatus extending from one side of its transverse plane of symmetry.
Figure 5:
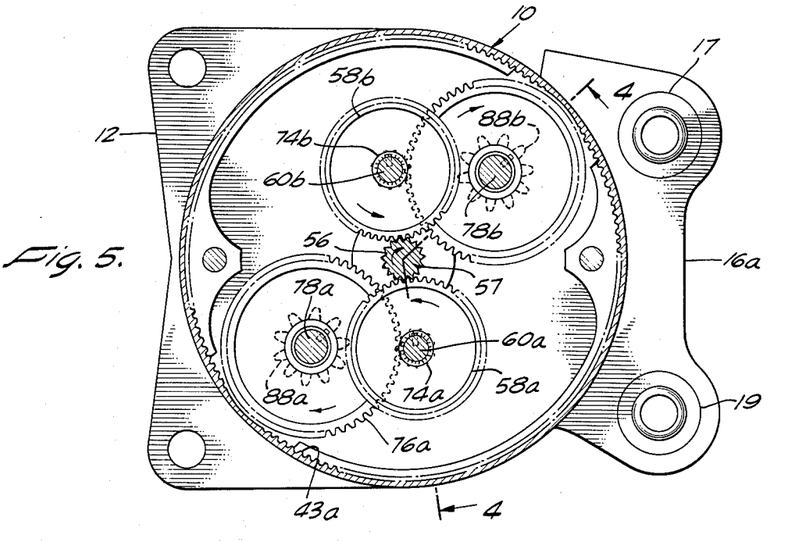
FIGURE 5 is a cross sectional view taken on line 5—5 of FIGURE 4.
Figure 6:
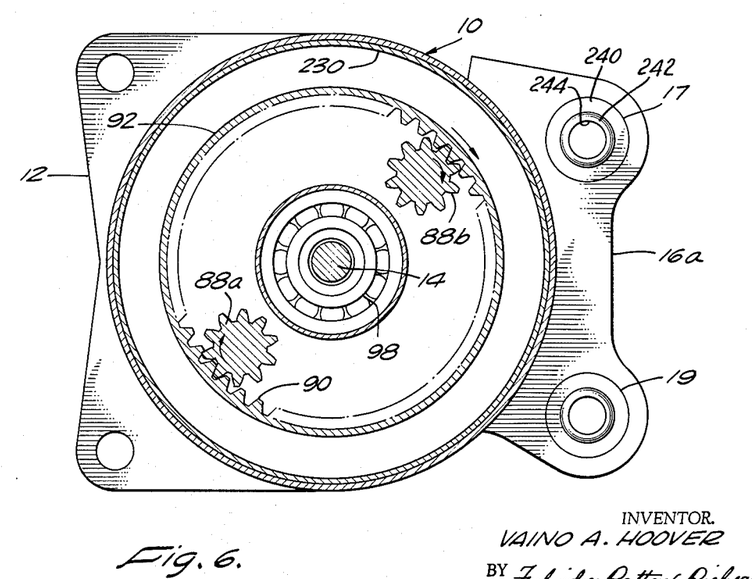
FIGURE 6 is a cross sectional view taken on line 6—6 of FIGURE 4.

The apparatus assembly contained within the cylindrical housing 10 has an arrangement of components, which is longitudinally symmetrical on either side of a longitudinally central, transverse plane of symmetry coincident with section lines 8—8 of FIGURES 3 and 4. For convenience of description, and with reference mainly to FIGURE 3, the components may be considered as comprising seven main coaxial sub-assemblies, namely, two identical, first stage gear reduction sub-assemblies, one each located within opposite end portions of the housing 10, as indicated at 30a and 30b, one second stage planetary gear reduction unit located within the central portion of the housing centered on the transverse plane of symmetry, as indicated at 32, two identical third stage planetary gear reduction units, each symmetrically located within portions of the housing longitudinally outwardly adjacent opposite sides of the second stage unit 32, as indicated at 34a and 34b, and a pair of actuator coupling stations, as indicated at 36a and 36b, for drivingly coupling the actuator arms 16a and 16b to the output of the third stage unit.

Referring now primarily to FIGURES 3 and 4, the housing 10 is provided at opposite ends with identical circular end closure cap members 40a and 40b having central shaft openings therein, as shown at 41. The axially flanged peripheries 41a and 41b of the end closure members are formed with circumferentially equally spaced apart spline teeth 42a and 42b, which make non-rotatable engagement within corresponding spline grooves 43a and 43b formed around the inner cylindrical surface of shouldered annular recesses 44a and 44b adjacent the ends of the bore of the housing 10. The end closure members 40a and 40b and other components of the apparatus, as will be more fully described hereinafter, are retained in proper axial position and concentrically centered in the housing 10 by annular retainer rings 46a and 46b, which are threaded internally into the opposite ends of the bore of the housing axially outwardly of the splined portion, as shown at 48a and 48b. The before mentioned input drive shaft 14 extends concentrically entirely through the housing 10 and is rotatably supported adjacent its opposite ends by means of a pair of ball bearings, one of which ball bearing is shown at 50. The outer race rings of the ball bearings 50 are contained and supported in coaxial shouldered annular recesses, one of which is shown at 52, formed centrally of the circular end closure cap members 40a and 40b and the shaft openings therethrough. The outwardly extending, opposite end portions of the drive shaft 14 are formed with external splines 53a and 53b for connection with correspondingly internally splined couplings 54a and 54b, for rotational driving coupling to suitable extension shafts and an actuating prime mover, not shown.

Inasmuch as the hereinbefore mentioned first stage gear reduction unit portions 30a and 30b are identical, and the third stage planetary gear reduction units 34a and 34b are identical, and the actuator coupling sections 36a and 36b are also identical, except that in each case they are arranged in longitudinally oppositely facing positions on opposite sides of the before mentioned plane of symmetry, the following description of these units will be largely confined to a description of one each of such identical portions or sections.

Referring now mainly to FIGURES 3, 4, 5, and 6, the first stage gear reduction portion 30a comprises the following:

The opposite end portions of the shaft 14 axially inwardly adjacent the before mentioned supporting ball bearing 50 is provided with a plurality of integrally formed gear teeth 56, such shaft portion and gear teeth 56 thus constituting a first input drive pinion 57. The drive pinion 57 meshes with a first pair of identical, diametrically oppositely positioned gears 58a and 58b, which are fixed to and supported on diametrically oppositely positioned, axially extending shafts 60a and 60b which, in turn, are each rotatably supported on opposite sides of the gears by ball bearings, as shown at 62 and 64. The outer race rings of the ball bearings 62 and 64 are supported in cylindrical, shouldered recesses or race pockets 66 and 68 formed respectively in the inner face of the before mentioned end closure cap member 40a and in the adjacent parallel face of an adjacent supporting diaphragm member 70.

The periphery of the diaphragm member 70 is provided with an integral, axially extending annular flange portion 71 which, like that of flange 41a of the end closure cap member 40a, is formed with spline teeth 72, which also make non-rotatable engagement within an extended portion of the spline grooves 43a. Both the end closure cap members 40a and diaphragm members 70 are thus concentrically and non-rotatably supported within the bore of the housing 10. The shafts 60a and 60b are provided with integrally formed gear teeth, as shown at 74a and 74b, such gear teeth and shaft constituting a second pair of pinions, which mesh with a second pair of identical, diametrically oppositely positioned gears 76a and 76b which are, in turn, fixed to and supported on diametrically oppositely positioned shafts 78a and 78b. The shafts 78a and 78b are each rotatably supported on opposite sides of the gears by ball bearings, as shown at 80 and 82 in FIGURE 4. The ball bearings 80 and 82 are supported in cylindrical, shouldered recesses or pockets, as shown at 84 and 86, formed respectively in the inner face of the before mentioned end closure cap member 40a and in the adjacent opposite parallel face of the before mentioned adjacent diaphragm member 70.

The shafts 78a and 78b are provided with integrally formed gear teeth, as shown at 88a and 88b, such gear teeth and shafts constituting a third pair of pinions, which both mesh with gear teeth 90 at diametrically opposite sides of an internal gear 92.

The hub 91 of the internal gear 92 is spline connected at 94 to a hollow auxiliary shaft 96, which concentrically rotatably surrounds the input drive shaft 14. The opposite ends of the auxiliary shaft 96 are rotatably supported in ball bearings, one of which is shown at 98, the outer race ring of such ball bearing 98 being coaxially supported in a cylindrical, shouldered recess or pocket, as shown at 100, formed in the center of the axially inward face of the before mentioned support diaphragm 70.

Figure 8:
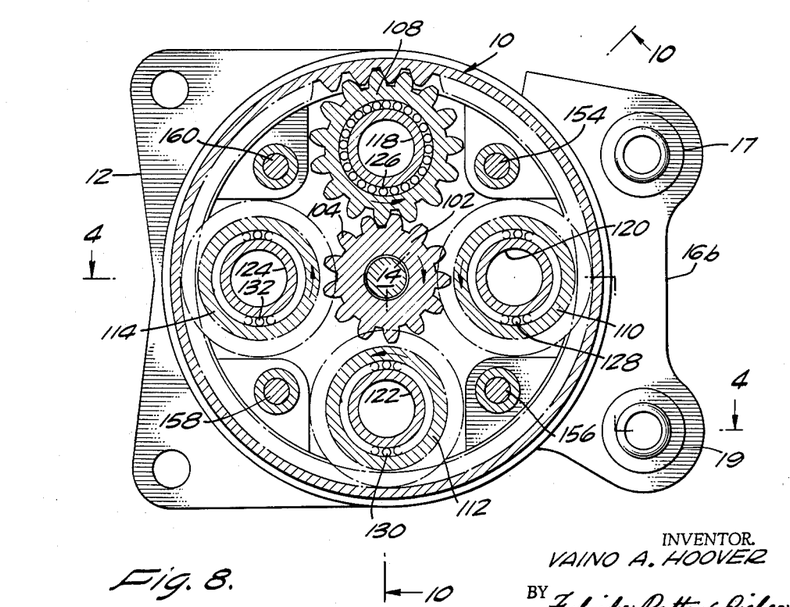
FIGURE 8 is a cross section view taken on line 8—8 of FIGURE 4.

Referring now further mainly to FIGURES 3, 4, 5, and 6, the second stage planetary gear reduction sub-assembly contained in portion 32 of the housing 10 comprises the following:

The auxiliary shaft 96 carries, centered intermediate its ends, an integrally formed pinion gear 102 having outwardly extending gear teeth 104, such pinion 102 constituting the so-called sun gear of the second stage planetary gear reduction sub-assembly. The teeth 104 of the sun gear 102 mesh with teeth 106 of two pairs of surrounding, diametrically oppositely positioned planet gears 108, 110, 112, and 114, as best shown in FIGURE 8, and the teeth 106 of the planet gears 108, 110, 112, and 114, in turn, mesh with inwardly projecting gear teeth 116 integrally formed throughout an intermediate length of the bore of the housing 10, that portion of the housing and the integral gear teeth thus constituting an internal ring for and common to the several planet gears. The planet gears 108, 110, 112, and 114 are rotatably supported on hollow bearing sleeves 118, 120, 122, and 124, respectively, by means of needle bearings 126, 128, 130, and 132, respectively.

Figure 10:
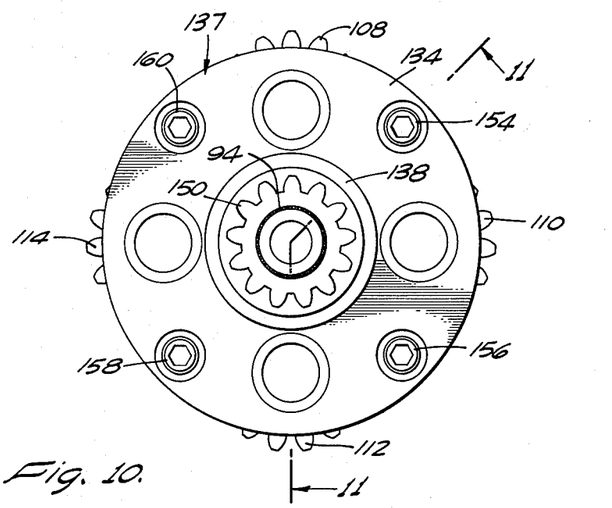
FIGURE 10 is a sectional, elevational detail view of the second stage planetary gear reduction section of the apparatus.
Figure 11:
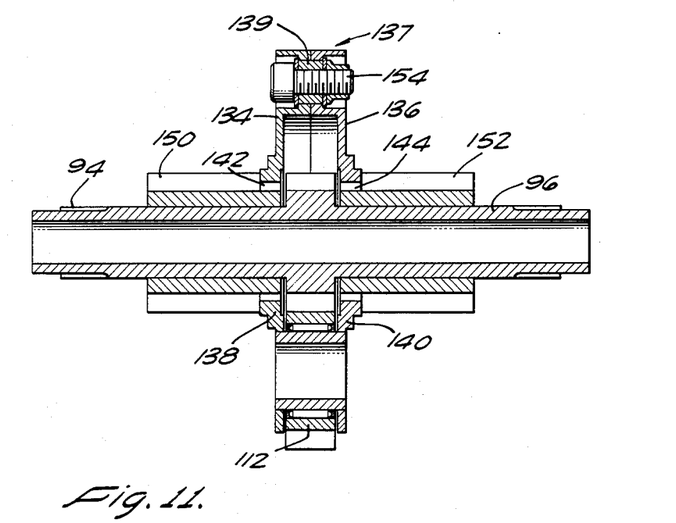
FIGURE 11 is a longitudinal sectional view taken on line 11—11 of FIGURE 10.

The planet gear supporting bearing sleeves 118, 120, 122, and 124 are supportingly fitted at their opposite ends into correspondingly located circular openings formed in a pair of spaced apart, opposite annular walls 134 and 136 of the two halves of a hollow, generally annular shaped carrier housing 137, as best shown in FIGURES 10 and 11. The inner faces of the walls 134 and 136 are spaced apart axially a distance substantially equal to the axial length of the planet gears 108, 110, 112, and 114 and are formed with central hub like portions 138 and 140 each having central openings provided with radially inwardly facing spline grooves 142 and 144. The spline grooves 142 and 144 are dimensioned to provide a tight press fit with corresponding radially outwardly extending spline lands integrally formed adjacent the axially innermost ends 146 and 148, respectively, of a pair of coaxial pinion gears 150 and 152. The pinion gears 150 and 152 constitute the so-called sun gears of the third stage planetary gear reduction portions 34a and 34b, respectively, as hereinafter described. The third stage sun gears 150 and 152 are rotatably supported concentric with the hollow auxiliary shaft 96 by their surrounding planet gears with which they mesh and by the before mentioned hubs 138 and 140 of the housing member walls 134 and 136 of the second stage planetary gear assembly. The two halves of the annular carrier housing 137 including their walls 134 and 136 are fastened together by means of bolts 154, 156, 158, and 160 to form a substantially closed housing around the planet gears. Each of the bolts 154, 156, 158, and 160 pass through a hollow dowel, as shown at 139 in FIGURE 11, which fits snugly through accurately bored holes in the opposite halves of the housing, to secure the two halves of the housing against misalignment and relative rotation. A short spacer sleeve 151 is positioned around the auxiliary shaft 96 intermediate the outer end of sun gear 150 and the axially oppositely facing shoulder 153 of the hub 91 of the internal gear 92 to restrict the axial movement of sun gears 150 and 152 and the attached second stage planetary gear components.

Figure 7:
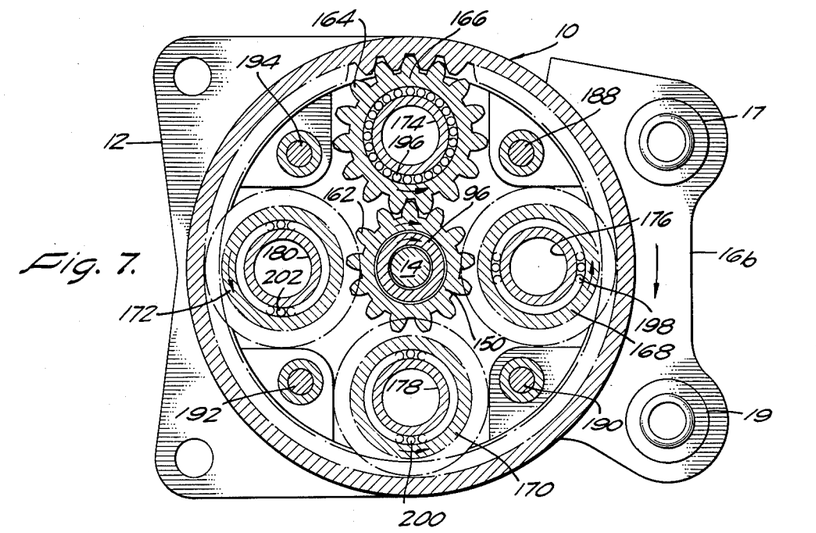
FIGURE 7 is a cross sectional view taken on line 7—7 of FIGURE 4.

Referring now mainly to FIGURES 3, 4, and 7, the third stage planetary gear reduction portions 34a and 34b, with reference mainly to the portion 34a which as before mentioned is identical to the portion 34b, comprise the following:

As before mentioned, the pinion gears 150 and 152 constitute the sun gears of the third stage planetary gear reduction portions 34a and 34b, respectively. Thus, the gear teeth 162 of the sun gear 150 mesh with the gear teeth 164 of two pairs of diametrically oppositely positioned planet gears 166, 168, 170, and 172.

Figure 12:
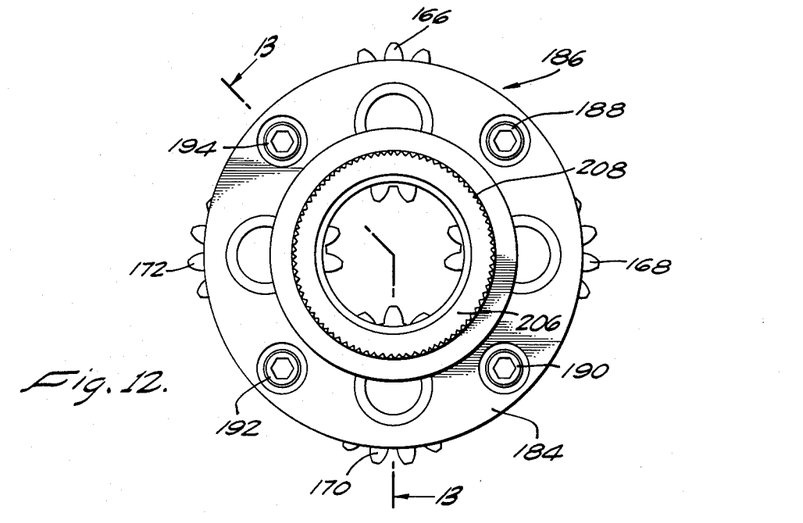
FIGURE 12 is a sectional elevational detail view of one of the two third stage planetary gear reduction sections of the apparatus.
Figure 13:
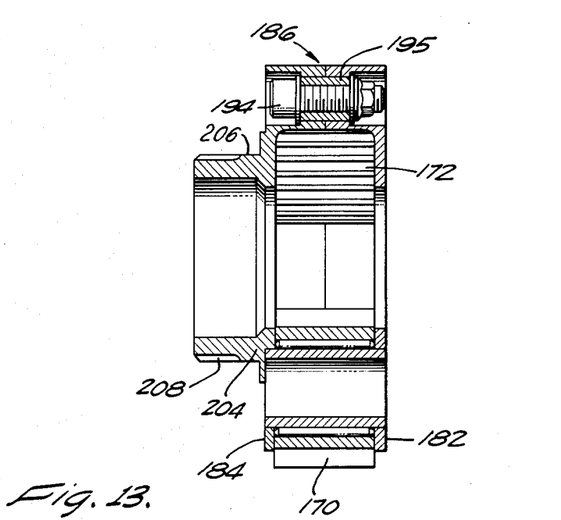
FIGURE 13 is a longitudinal sectional view taken on line 13—13 of FIGURE 12.

The planet gears 166, 168, 170, and 172 are rotatably supported on hollow bearing sleeves 174, 176, 178, and 180, respectively. The opposite ends of the bearing sleeves are supported in correspondingly positioned circular openings formed in the opposite generally annular shaped walls 182 and 184 of the two halves of a carrier housing 186, as best shown in FIGURES 12 and 13. The inner faces of the walls 182 and 184 are spaced apart axially a distance substantially equal to the axial length of the planet gears 166, 168, 170, and 172. The two halves of the housing are fastened together in coaxial alignment by means of bolts 188, 190, 192, and 194 circumferentially equally spaced apart and passing axially through the housing intermediate the before mentioned planet gear bearing sleeves 176, 178, 174, and 180. Each of the bolts 188, 190, 192, and 194 pass through a hollow dowel, as shown at 195 in FIGURE 13, which fits snugly through accurately bored holes in the opposite halves of the housing, to secure the two halves thereof against misalignment and relative rotation. The planet gears 166, 168, 170, and 172 are rotatably supported on the before mentioned bearing sleeves 174, 176, 178, and 180, respectively, by means of needle bearings 196, 198, 200, and 202, respectively.

The annular wall 184 of one half of the carrier housing 186 is formed with a coaxially extending hollow hub portion 204, the exterior surface of which is formed with a smooth cylindrical root portion 206 and an adjacent splined surface portion 208. The hub 204 constitutes a supporting and driving member for the actuator coupling section 36a, the description of which follows.

Surrounding and press fitted onto the before mentioned exterior surface of the hub 204 is an annular hub portion 210 being formed with a splined portion 212 and an adjacent smooth cylindrical portion 214. The splined portion 212 interlocks with the exterior splined surface 208, and also the cylindrical surface portion 214 makes aligned seating engagement with the cylindrical surface 206 of the hub 204. The annular hub portion 210 is formed with an integral, intermediate, annular shaped, radially extending web 216, from which the actuator arm 16a integrally extends radially out through a slot 18a of limited circumferential length formed through the wall of the housing 10. On axially opposite sides of the annular web 216 are a pair of ball bearings 218 and 220, the inner races of which supportingly surround the oppositely extending cylindrical shoulder surfaces of the actuator hub 210 formed on opposite sides of the web 216. The outer races of the ball bearings 218 and 220 are seated in shouldered annular recesses or pockets 222 and 224 formed in a pair of generally annular shaped, diametrically extending bearing supporting members 226 and 228, respectively.

The supporting member 226 is formed with a cylindrical, axially extending outer flange 230, which makes a light press fit within the surrounding portion of the bore of the housing 10. The periphery 232 of the bearing supporting member 220 also makes a light press fit with the surrounding portion of the bore of the housing 10, and also includes an axially extending, annular flange portion 234, which makes telescoping interengagement within one end of the adjacent axially extending flange portion 230 of the supporting member 226. The axially facing, outer marginal portion 236 of the annular bearing supporting member 228 adjacent its periphery 232 makes seating engagement against an axially oppositely facing annular shoulder 238 formed in the housing 10. This positioning engagement of the marginal portion 236 with the shoulder 238 is maintained by suitable axial force, which is transmitted thereto from the hereinbefore mentioned annular retainer ring 46a, which force is transmitted by way of annular flange 41a of the enclosure member 48, annular flange 71 of the diaphragm supporting member 70, and annular flange 230 of the bearing supporting member 226. These members are thus locked in proper axial positions relative to one another and relative to the housing 10.

Each of the actuator arms 16a and 16b, such arms and the associated mechanisms being identical, as hereinbefore mentioned, are provided adjacent the laterally extending outer ends thereof with a pair of attachment swivel bearing openings, as shown at 17 and 19. Contained within each of the attachment bearing openings 17 and 19 is a bushing 240 formed with a bore therethrough having the shape of a spherical zone, and within each such bore is contained an attachment insert 242 having a central bolt hole 244 and an exterior surface, which also has the shape of a spherical zone slidably fitting the spherical zone surface of the bore of the bushing 240. The attachment inserts 242 thus contained within the actuator arms 16a and 16b are provided with sufficient freedom for swivelling motion to accommodate some misalignment of the attachment bolts placed through the bolt holes 244 of the insert 242 for attachment of the actuator arms to the attachment fixtures 224 of the flap structure, as hereinbefore mentioned in connection with FIGURE 2.

Figure 1:
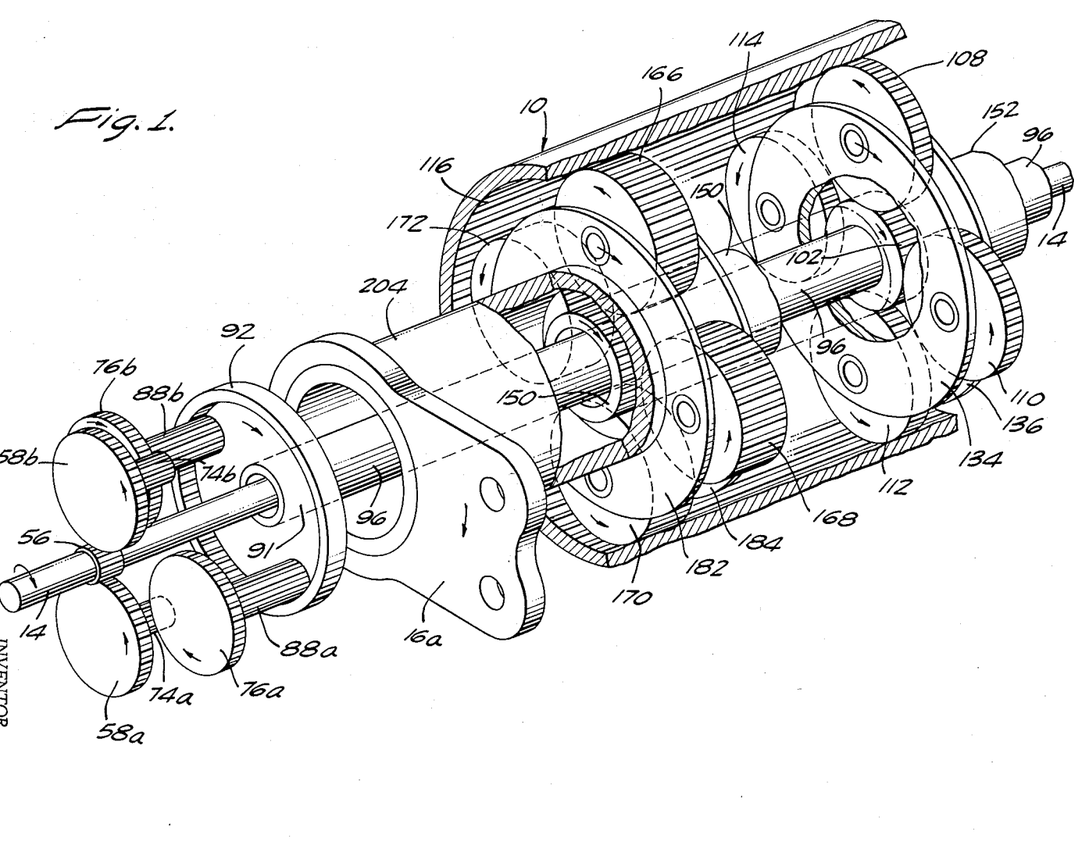
FIGURE 1 is a fragmentary perspective view in schematic form, of that portion of the apparatus shown in FIGURE 4, illustrating the general assembly of the apparatus of the invention.

The operation of the apparatus of this invention, with reference particularly to FIGURE 1, is briefly as follows.

Input drive shaft 14 is driven through one or the other of couplings 54a or 54b and shafts extending therefrom by suitable means, such as an electric or hydraulic motor, located elsewhere in the airfoil or in the airplane fuselage (not shown). Shaft 14 drives pinion 56 which, in turn, simultaneously drives gears 58a and 58b. Gears 58a and 58b drive the pinions 74a and 74b which, in turn, simultaneously drive gears 76a and 76b. Gears 76a and 76b drive pinions 88a and 88b which, in turn, simultaneously drive the internal gear 92 of the first stage gear reduction section 30a.

Internal gear 92 acting through hub 91 and shaft 96 drives the centrally located pinion 102 which, in turn, meshes with and simultaneously drives the four planet gears 108, 110, 112, and 114 of the second stage planetary gear reduction section, as indicated at 32 in FIGURE 3. The four planet gears 108, 110, 112, and 114 mesh within the surrounding gear teeth 116 formed integrally on the bore of the housing 10, which constitutes the ring gear for planetary gear reduction section 32 and also for the planetary gear reduction sections 34a and 34b.

The resultant orbital rotation or planetation of the planet gears 108, 110, 112, and 114 which carry with them the supporting carrier housing 154, results in corresponding rotation of the sun gears 150 and 152 of the two third stage planetary gear reduction sections, the sun gear 152 not being shown in FIGURE 1, but being partially shown in FIGURE 3. Such rotation of the sun gear 150 results in driving the surrounding planetary gears 166, 168, 170, and 172 which, in turn, are in meshing engagement with the before mentioned surrounding gear ring portion 116 of the housing 10, with the result that the housing 186, on which the planet gears 166, 168, 170, and 172 are rotatably supported, is correspondingly rotated which also, in turn, rotates the hub 204 and the actuator arm 16a spline attached thereto.

As hereinbefore mentioned, the apparatus of the invention is symmetrically arranged on opposite sides of the transverse plane of symmetry which coincides with the line 8—8 shown in FIGURE 3. Thus, with reference to the apparatus, as viewed in FIGURE 1, the operation of the portion of the apparatus omitted from the right hand end of the drawing is a duplication of that of the third stage planetary gear reduction portion and that of the first stage gear reduction portion, the operations of which have just been described principally in connection with FIGURE 1.

An important feature of the apparatus of this invention, as herein described, resides in the simultaneous parallel construction and drive of the two first stage gear reduction units 30a and 30b whereby the sizes and weights of all the gears there involved may be substantially reduced. Also, the rotational forces from the first stage gear reduction sections 30a and 30b are introduced into the hollow shaft 96, which carries the single central sun gear pinion 102 which, in turn, drives the second stage planetary gear reduction section 32. Then, from this point, the rotational torque is transferred from the second stage planetary gear reduction section 32 symmetrically outwardly and divided between the two symmetrically positioned third stage planetary gear reduction sections 34a and 34b, whereby these may also have a construction of substantially smaller sizes and lower weights for the transmission of given forces than would otherwise be necessary, and furthermore, this construction results in a more satisfactory balance of forces relative to the longitudinal and lateral axis of the unit as a whole. Finally, the rotational motion and forces from the symmetrically located planetary gear reduction sections 34a and 34b are transferred symmetrically outwardly therefrom to the two actuator arms 36a and 36b, which are thus caused to move simultaneously angularly with respect to the housing 10 of the unit, and whereby it is assured that the movement of these actuator arms will be precisely simultaneous and capable of equally sharing the torsional load without appreciable angular displacement relative to one another.

Another important feature of the design of the apparatus of this invention resides in positioning the supporting shafts and sleeves upon which the several gears rotate in transverse or radial alignment with one another. For example, in the first stage gear reduction unit 30a, the centers of rotation of the pinion 56 and the gears 58a and 58b driven thereby, all lie on a single diametral line. Likewise, the centers of the gears 76a and 76b and the pinions 88a and 88b coaxially driven thereby also lie on a single diametral line. Thus, the resultant lateral forces in the several shafts involved are largely balanced out. For example, since the gears 58a and 58b are positioned on diametrically opposite sides of the pinion 56, with which they mesh, the equal and opposite forces acting on the single input drive shaft 14 are balanced out, and thus it becomes unnecessary to provide large and heavy supporting bearings for the drive shaft 14 and permits a much slimmer and lighter drive shaft to be used. The same effect as that just described results throughout the whole gear reduction unit. For example, in the case of the sun gears 102, 150, and 152 and the shaft 96, to which they are attached and upon which they ride, the resultant transverse forces therein are substantially completely balanced out, thereby eliminating the necessity of employing relatively large and heavy bearing supporting means for these components.

Another important feature of the present invention resides in the novel combination of numbers of gear teeth on the several gears employed in connection with the planetary or epicyclic arrangements of the second and third stage planetary gear reduction sections of the apparatus whereby, as hereinbefore mentioned, the tooth contact locations between different intermeshing gears are at different phases with respect to one another, such that, for any given gear, maximum tooth stresses in the several meshing teeth thereof do not occur simultaneously, whereby a smoother operating and stronger gear train structure results.

In the specific design herein disclosed, by way of example, and which satisfies the hereinafter specified design rules, the sun gears 104, 150, and 152 each have 13 teeth, the planet gears 108, 110, 112, and 114 and also planet gears 166, 168, 170, and 172 each have 15 teeth. The surrounding ring gear which is formed integrally with the housing 10, as hereinbefore described, and with which mesh all four of the planet gears of each planetary gear train, has 43 teeth. The diametral pitch of these several gears are chosen such as to make these combinations of teeth possible.

Figure 9:
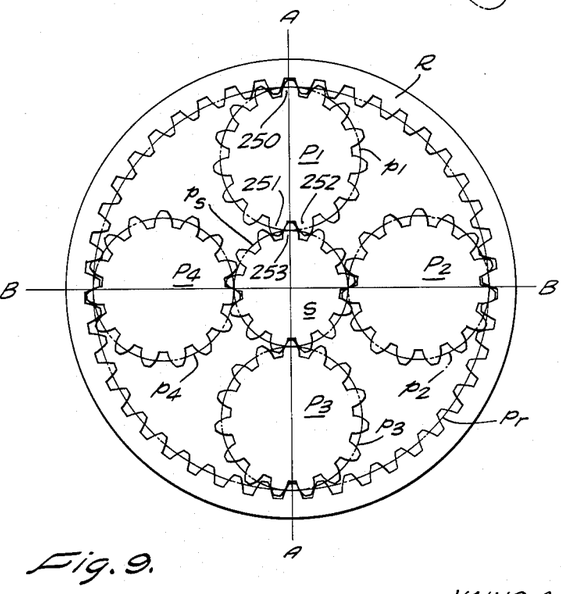
FIGURE 9 is a fragmentary cross sectional view similar to FIGURES 7 and 8, illustrating simultaneous different relative positions of gear teeth in the several intermeshing gears.

Referring to FIGURE 9, which diagrammatically illustrates the foregoing specific arrangement of gears and which is typical of each of the hereinbefore described planetary gear trains or any gear train designed in accordance with the before mentioned rules, let it be assumed for convenience of illustration, that the gears are in the instantaneous relative position shown in the diagram, in which the gear tooth 250 of planet gear $P_1$ is exactly centered in the space 252 between two teeth of the ring gear R and is centered on the axis line A—A which passes through the centers of gears R, $P_1$, S, and $P_3$. Inasmuch as planet gear $P_1$ has 15 teeth, the point on the pitch circle diametrically opposite tooth 250 lying on axis A—A where it meshes with the sun gear S will correspond to a circumferential distance therefrom which is subtended by 7½ teeth and will, therefore, be centered in the space between the two teeth 251 and 252 of the planet gear $P_1$, and the tooth 253 of sun gear S will be centered between such teeth 251 and 252 on axis A—A. Since sun gear S has 13 teeth, the point of tangency of pitch circle $P_s$ with pitch circle $P_2$ lying on the axis B—B 90° clockwise from tooth 253 where the sun gear S meshes with planet gear $P_2$ corresponds to a circumferential distance subtended by 3¼ teeth, and the point of tangency of pitch circle $p_s$ with pitch circle $p_3$ on the axis A—A 180° from the center of tooth 253 where the sun gear S meshes with planet gear $P_3$ corresponds to an angle subtended by 6½ teeth. Likewise, the point of tangency of pitch circle $p_s$ with pitch circle $p_4$ on the axis B—B 270° from the center of tooth 253, where the sun gear S meshes with planet gear $P_4$ corresponds to an angle subtended by 9¾ teeth. Thus, it is seen that the points of contact between the faces of the gear teeth at the four point where sun gear S meshes with planet gears $P_1$, $P_2$, $P_3$, and $P_4$ are each successively out of phase or displaced with respect to each other by ¼ of the circular pitch of the gear teeth. Thus, the position of the pressure point between mutually contacting faces of the gear teeth at these four locations are each always correspondingly different.

Similarly, it will be seen that the pressure points between the intermeshing teeth of the planet gears and the ring gear are likewise each successively out of phase or displaced with respect to each other by ¼ of the circular pitch of the gear teeth. Therefore, the positions of the pressure points between mutually contacting faces of the gear teeth at the four points of intermesh between the planet gears $P_1$, $P_2$, $P_3$ and $P_4$ and the ring gear R are each likewise always correspondingly different. Thus, at no time are any of the gear teeth between the sun gear and the planet gears and between planet gears and ring gear simultaneously subjected to a condition of maximum stress, but instead at a time when one of the intermeshing teeth between the sun gear and one of the planet gears is at a maximum stress condition, the other intermeshing teeth between the sun gear and the planet gears and between planet gears and ring gear are under various conditions of lesser stress.

It has been discovered that the foregoing advantageous gear design conditions are accomplished in any epicyclic gear train consisting of a ring gear, a sun gear, and a plurality of equally spaced, intermeshing planet gears, by designing the gear system in accordance with the following rules:
Where $N_p$=number of equally spaced planet gears
$R$=number of teeth in the ring gear
$S$=number of teeth in the sun gear then, the following conditions must be met:

$$\frac{R+S}{N_p}=\text{a whole number}$$

and either one or the other of the following conditions must also simultaneously result:

$$\frac{S}{N_p}=\text{a whole number}+\frac{I}{N_p}$$

or $$\frac{R}{N_p}=\text{a whole number}+\frac{I}{N_p}$$

The foregoing gear design conditions not only contribute to greater effective strength and durability of the gear trains, but also result in smooth running, more torsional vibrationfree transmission of torque, which also indirectly contributes to minimizing internal stresses and wear.

In one specific design of the apparatus of this invention, the following gear sizes and gear tooth numbers were employed.

In each of the first stage gear reduction sections, indicated at 30a and 30b in FIGURE 3, one of such sections being shown in FIGURE 1, the input drive shaft pinion 56 has 15 teeth. The gears 58a and 58b meshing with the pinion 56 each have 55 teeth. The pinions 74a and 74b driven by the gears 58a and 58b each have 10 teeth. Each of the gears 76a and 76b driven by the pinions 74a and 74b have 56 teeth. Each of the pinions 88a and 88b driven by the gear 76a and 76b have 10 teeth. The internal gear 92 with which the pinions 88a and 88b internally mesh has 50 teeth. With these gear sizes, each of the two first stage gear reduction sections have a gear reduction ratio of 102.6 to 1. With the gear sizes hereinbefore described in the second and third planetary gear reduction sections 34a and 34b, the gear reduction ratio resulting therefrom is approximately 18.56 to 1 resulting in an overall gear reduction between the input drive shaft 14 and the output actuator arms 16a and 16b of about 1904 to 1.

The overall outside size of the cylindrical portion of the housing 10 is approximately 8½" long by 3" in diameter. The apparatus is designed to permit an operational angular motion of the actuating arms 16a and 16b of approximately 60° within the limits of the circumferential length of slots 18a and 18b in the housing 10 through which they radially extend.

In operation, the unit is designed for rotation of the input drive shaft 14 at approximately 2000 r.p.m. with running input torques of approximately 25 in./lbs. and resultant output actuator arm torques of approximately 30,000 in./lbs. at an angular rate of motion thereof of approximately 1 r.p.m.

It is to be understood that the foregoing is illustrative only and that the invention is not limited thereby, but may include various modifications and changes made by those skilled in the art without departing from the scope of the invention, as defined in the appended claims.

What is claimed is:
1. Gear reduction actuator apparatus comprising:
a housing having a cylindrical bore;
a ring gear formed integrally with said housing within said bore;
a drive shaft extending coaxially within said gear ring;
a first sun gear on said shaft;
a first planet gear rotatably mounted on a first carrier means in said housing for simultaneous planetation around said first sun gear, said planet gear meshing with both said sun gear and said ring gear;
a second and third sun gear mounted axially symmetrically on opposite sides of said first sun gear for rotation coaxially relative thereto;
means drivingly interconnecting said first carrier means with said second and third sun gear for coaxial rotation of said second and third sun gear relative to said housing;
a second and third planet gear rotatably mounted on second and third carrier means, respectively, in said housing for simultaneous planetation around said second and third sun gear, respectively, said second and third planet gear meshing with both said second and third sun gear, respectively, and said ring gear;

and an actuator member coupled to each said second and third carrier means for coaxial rotational movement thereby.

2. Apparatus according to claim 1 in which said actuator member comprises a lever arm extending radially through a circumferential slot in said housing, for angular motion between rotational angular limits imposed by said slot.

3. Gear reduction actuator apparatus comprising:
a housing;
a ring gear fixed in said housing;
an input shaft extending coaxially through said ring gear;
a pair of pinion gears on said input shaft adjacent opposite ends thereof;
a pair of gear reduction trains in said housing adjacent opposite ends thereof, said gear trains being driven by said pinions;
a hollow shaft in said housing concentrically surrounding said input shaft and mounted for coaxial rotation;
means coupling the output of said gear trains to opposite end portions of said hollow shaft for rotation thereof;
a first sun gear fixed on said hollow shaft intermediate said opposite ends thereof;
a first plurality of planet gears rotatably mounted on a first carrier means in said housing for simultaneous coaxial planetation around said first sun gear, each said planet gear meshing with both said first sun gear and said ring gear;
a second and a third sun gear mounted axially symmetrically on opposite sides of said first sun gear for concentric rotation around said input shaft and said hollow shaft;
means drivingly interconnecting said first carrier means with said second and third sun gear for coaxial rotation of said second and third sun gears relative to said housing;
a second and third plurality of planet gears rotatably mounted on second and third carrier means, respectively, in said housing for simultaneous planetation around said second and third sun gears, respectively, said second and third plurality of planet gears meshing with both said second and third sun gears, respectively, and said ring gear;
and an actuator member coupled to each said second and third carrier means for coaxial rotational movement thereby relative to said housing.

4. Gear reduction actuator apparatus comprising:
a housing;
a ring gear fixed in said housing;
an input shaft extending coaxially through said ring gear;
a pair of pinion gears on said input shaft adjacent opposite ends thereof;
a pair of gear reduction trains in said housing adjacent opposite ends thereof, said gear trains being driven by said pinions;
a hollow shaft in said housing concentrically surrounding said input shaft and mounted for coaxial rotation;
means coupling the output of said gear trains to opposite end portions of said hollow shaft for rotation thereof;
a first sun gear fixed on said hollow shaft intermediate said opposite ends thereof;
a first plurality of planet gears rotatably mounted on a first carrier means in said housing for simultaneous coaxial planetation around said first sun gear, each said planet gear meshing with both said first sun gear and said ring gear;
a second and a third sun gear mounted axially symmetrically on opposite sides of said first sun gear for concentric rotation around said input shaft and said hollow shaft;
means drivingly interconnecting said first carrier means with said second and third sun gear for coaxial rotation of said second and third sun gears relative to said housing;
a second and third plurality of planet gears rotatably mounted on second and third carrier means, respectively, in said housing for simultaneous planetation around said second and third sun gears, respectively, said second and third plurality of planet gears meshing with both said second and third sun gears, respectively, and said ring gear;
and a pair of lever arms, one each of said lever arms being coupled to each of said second and third carrier means for angular rotational movement thereby.

5. Gear reduction actuator apparatus comprising:
a housing having a cylindrical bore therethrough;
a ring gear formed integrally with said housing and coaxially of said bore;
an input drive shaft extending coaxially through said ring gear and said bore;
a pair of pinion gears on said input drive shaft adjacent opposite ends of said housing;
a pair of gear reduction trains in said housing adjacent opposite ends thereof, the input of said gear trains each being driven by each said pinion gears;
a hollow shaft in said housing concentrically surrounding said input drive shaft and mounted for coaxial rotation therearound;
means coupling the output of said gear trains to opposite end portions of said hollow shaft for rotation thereof;
a first sun gear fixed on said hollow shaft intermediate said opposite ends thereof;
a first plurality of planet gears rotatably mounted on a first carrier means in said housing for simultaneous coaxial planetation around said first sun gear, each said planet gear meshing with both said first sun gear and said ring gear, whereby said first carrier means is rotated coaxially of said first sun gear;
a second and a third sun gear mounted axially symmetrically on opposite sides of said first sun gear for rotation concentrically of said input shaft and said hollow shaft;
means drivingly coupling said first carrier means with said second and third sun gear for coaxial rotation of said second and third sun gears relative to said housing;
a second and a third plurality of planet gears rotatably mounted on second and third carrier means, respectively, in said housing for simultaneous rotation and planetation around said second and third sun gears, respectively, said second and third plurality of planet gears meshing with both said second and third sun gears, respectively, and with said ring gear; whereby said second and third carrier means are rotated coaxially of said second and third sun gears;
a pair of axially separated, circumferentially extending slots in said housing;
and a lever arm extending transversely through each said slots, each such lever arm being coupled to each said second and third carrier means for simultaneous angular rotational movement within the limits of the length of said slots.

6. Apparatus according to claim 5 in which said second sun gear and second planet gears, and said third sun gear and said third planet gears are positioned axially symmetrical relative to said first sun gear and first planet gears.

7. In a gear reduction actuator, apparatus comprising:
a housing;

a first pair of gear reduction trains, one each being fixedly positioned within said housing adjacent opposite ends thereof;

an input drive shaft extending coaxially through said housing and coupled for simultaneous driving of the input of said first pair of gear reduction trains in parallel;

a second gear reduction train fixedly positioned centrally in said housing, intermediate the gear reduction trains of said first pair;

an auxiliary shaft extending coaxially of said housing and said input drive shaft, operatively coupling the outputs of said first pair of gear reduction units with the input of said second, centrally located gear reduction train;

and a lever arm extending through an opening in the side of said housing and operatively coupled to the output of said second gear reduction train for angular motion about the longitudinal axis of said housing.

8. In a gear reduction actuator, apparatus comprising:
a housing;
a first pair of gear reduction trains, one each being fixedly positioned within said housing adjacent opposite ends thereof;

an input drive shaft extending coaxially through said housing and coupled for simultaneous driving of the inputs of said first pair of gear reduction trains in parallel;

a second gear reduction train fixedly positioned centrally in said housing, intermediate the gear reduction trains of said first pair of gear reduction trains;

an auxiliary shaft extending coaxially of said housing and said input drive shaft, operatively coupling the outputs of said first pair of gear reduction units with the input of said second, centrally located gear reduction train;

a second pair of gear reduction trains, one each being fixedly positioned within said housing intermediate said second gear reduction train and one each of said first gear reduction trains;

coupling means extending coaxially of said auxiliary shaft and said input drive shaft interconnecting the output of said second gear reduction train with the inputs of said second pair of gear reduction trains for simultaneous driving thereof in parallel;

and a pair of lever arms extending through an opening in the side of said housing, one each of said arms being operatively coupled to the output of one each of said second pair of gear reduction trains for simultaneous angular motion relative to said housing coaxially of said auxiliary shaft and said input drive shaft.

9. In a gear reduction actuator, apparatus comprising:
a shaft;
a sun gear fixed coaxially on an intermediate portion of said shaft;
a carrier means rotatable on said shaft, including a pair of coaxial, generally cup shaped annular housing members detachably attached together in face to face relationship to form a generally annular housing having a cylindrically hollow cavity therein, said sun gear being located coaxially within said cavity;
a plurality of planet gears rotatably mounted in said housing on parallel, equally circumferentially spaced-apart bearing means supported in said cavity between said housing members and operatively meshing with said sun gear;
a plurality of circumferentially spaced-apart slots formed through the periphery of said housing through which a peripheral portion of each of said planet gears extend for meshing engagement with a coaxially surrounding ring gear;
a pair of coaxial hub means, one each formed on each said housing members;

a pair of sun gears extending coaxially from opposite exterior sides of said hub means for engagement with a plurality of adjacent planet gears;

and means detachably interconnecting each of said pair of sun gears which each said hub means for simultaneous coaxial rotation of said sun gears about said shaft, whereby torsional forces may be transferred symmetrically from said first mentioned sun gear to said housing members and thence symetrically through said pair of sun gears.

10. In a gear reduction actuator, apparatus comprising:
a shaft;
a sun gear fixed coaxially on an intermediate portion of said shaft;
drive means for simultaneously applying rotational torque of a like magnitude and direction to each opposite end of said shaft;
a carrier means rotatable coaxially about said shaft, including a pair of coaxial, generally annular, oppositely facing housing halves detachably attached together in face-to-face relationship to form a generally annular housing enclosure coaxial with said shaft and coaxially containing such sun gear;
bearing means supported in said housing enclosure between said housing halves, opposite ends of said bearing means being supported in respective opposite ones of said opposite housing halves;
a planet gear rotatably mounted on said bearing means in said housing enclosure and operatively engaging said sun gear;
and a pair of drive connection means fixed to and extending coaxially from opposite exterior sides of said housing enclosure halves for rotation coaxially of said shaft.

11. In a gear reduction actuator, apparatus comprising:
a shaft;
a sun gear fixed coaxially on said shaft;
drive means for simultaneously applying rotational torque of a like magnitude and direction to each opposite end of said shaft;
a carrier means rotatable coaxially about said shaft, including a pair of coaxial, generally annular, oppositely facing housing halves detachably attached together in face-to-face relationship to form a generally annular housing enclosure coaxial with said shaft and coaxially containing said sun gear;
a plurality of bearing means supported in said housing enclosure between said housing halves, opposite ends of each said bearing means being supported in respective opposite ones of said opposite housing halves;
a planet gear rotatably mounted on each of said bearing means in said housing enclosure and each operatively engaging said sun gear;
and a drive connection means fixed to and extending coaxially from an exterior side of at least one of said housing enclosure halves for rotation coaxially of said shaft;
means for positively securing said housing halves against coaxial rotational displacement relative to one another, thereby to maintain the axis of said bearing means of each of said planet gears axially parallel with the axis of said shaft and sun gear, said means including a plurality of tubular dowel members extending axially between said housing halves with opposite ends of said dowel members extending into and engaging dowel receiving bores in said housing halves;
and fastening means extending coaxially through said dowel members and said bores and engaging outer portions of said housing halves for securing said housing halves axially together in said face-to-face relationship.

12. Apparatus in accordance with claim 11 and circumferentially spaced-apart, circumferentially extending slots formed through the periphery of said housing enclosure, intermediate said housing halves, through each of which a portion of each of said sun gears extend for engagement with a surrounding ring gear.

13. In a gear reduction actuator, apparatus comprising:
a shaft;
a sun gear fixed coaxially on an intermediate portion of said shaft;
drive means for simultaneously applying rotational torque of a like magnitude and direction to each opposite end of said shaft;
a carrier means rotatable coaxially about said shaft, including a pair of coaxial, generally annular, oppositely facing housing halves detachably attached together in face-to-face relationship to form a generally annular housing enclosure coaxial with said shaft and coaxially containing said sun gear;
a plurality of bearing means supported in said housing enclosure between said housing halves, opposite ends of each said bearing means being supported in respective opposite ones of said opposite housing halves;
a planet gear rotatably mounted on each of said bearing means in said housing enclosure and each operatively engaging said sun gear;
and a pair of drive connection means fixed to and extending coaxially from opposite exterior sides of said housing enclosure halves for rotation coaxially of said shaft;
means for positively securing said housing halves against coaxial rotational displacement relative to one another, thereby to maintain the axis of said bearing means of each said planet gears axially parallel with the axis of said shaft and sun gear, said means including a plurality of tubular dowel members extending axially between said housing halves with opposite ends of said dowel members extending into and engaging dowel receiving bores in said housing halves;
and fastening means extending coaxially through said dowel members and said bores and engaging outer portions of said housing halves for securing said housing halves axially together in said face-to-face relationship.

References Cited by the Examiner

UNITED STATES PATENTS

| | | | |
|---|---|---|---|
| 1,350,822 | 8/20 | McNitt | 74—801 |
| 2,043,261 | 6/36 | Neuland | 74—801 |
| 2,826,939 | 3/58 | Dever | 74—801 |
| 2,868,271 | 1/59 | Pickles | 74—768 X |
| 2,944,444 | 7/60 | Burns | 74—801 |
| 2,966,808 | 1/61 | Grudin | 74—801 X |
| 3,008,355 | 11/61 | Grudin | 74—801 |
| 3,056,314 | 10/62 | Eichler et al. | |
| 3,062,073 | 11/62 | Brass | 74—801 X |
| 3,080,775 | 3/63 | Fritsch | 74—801 |

FOREIGN PATENTS 638,939  6/50  Great Britain.

DON A. WHITE, *Primary Examiner.*